United States Patent
Wagner et al.

(10) Patent No.: US 8,875,113 B2
(45) Date of Patent: Oct. 28, 2014

(54) MANAGING JAVA CLASS PATHS

(75) Inventors: Timothy Allen Wagner, Seattle, WA (US); Jesse Michael Garms, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 2076 days.

(21) Appl. No.: 11/744,141

(22) Filed: May 3, 2007

(65) Prior Publication Data

US 2007/0277159 A1 Nov. 29, 2007

Related U.S. Application Data

(60) Provisional application No. 60/746,409, filed on May 4, 2006.

(51) Int. Cl.
*G06F 9/45* (2006.01)
*G06F 9/44* (2006.01)
*G06F 9/445* (2006.01)

(52) U.S. Cl.
CPC .. *G06F 9/445* (2013.01); *G06F 8/41* (2013.01)
USPC .......................................... 717/145; 717/120

(58) Field of Classification Search
USPC .................................................. 717/120, 145
See application file for complete search history.

(56) References Cited

U.S. PATENT DOCUMENTS

| | | | |
|---|---|---|---|
| 6,637,025 B1 * | 10/2003 | Beadle et al. ................. | 717/148 |
| 6,804,682 B1 * | 10/2004 | Kemper et al. ........................ | 1/1 |
| 7,721,276 B2 * | 5/2010 | Lwo .............................. | 717/166 |
| 2006/0150169 A1 * | 7/2006 | Cook et al. .................... | 717/156 |
| 2007/0061794 A1 * | 3/2007 | Mausolf et al. ............... | 717/162 |

* cited by examiner

*Primary Examiner* — Li B Zhen
*Assistant Examiner* — Hang Pan
(74) *Attorney, Agent, or Firm* — Miles & Stockbridge P.C.

(57) ABSTRACT

A data structure is provided that determines which application elements need to be recompiled in a compiler as a result of a change to other application elements, where the change to the other application elements are related to a change in a Java Class Path. The determined application elements are recompiled along with any application elements that have dependencies on the determined application elements.

20 Claims, 1 Drawing Sheet

MANAGING JAVA CLASS PATHS

CLAIM OF PRIORITY

This application claims priority from the following application, which is hereby incorporated in their entirety:

U.S. Provisional Application No. 60/746,409 entitled MANAGING JAVA CLASS PATHS, filed by Timothy A. Wagner et al., filed May 4, 2006.

BACKGROUND OF INVENTION

Complex Java applications can include a large number of files in different repositories and folders. The file included in the application and indicated by a Java Class Path. Typically, when any of the files or the application is modified all of the files need to be recompiled. For complex applications this can take a significant amount of time.

DETAILED DESCRIPTION

Figure 1:
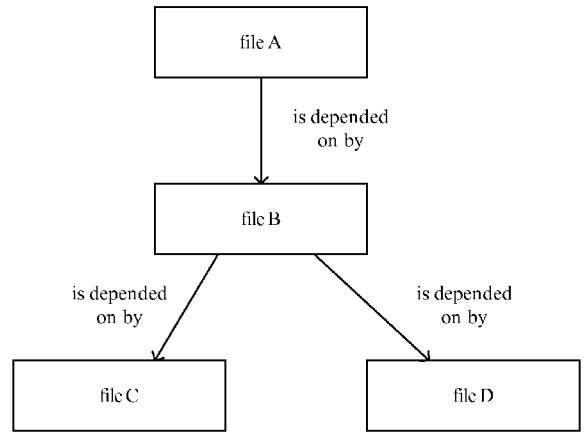
FIG. 1 shows an inverted file dependency tree.

In one embodiment, a data structure of a JAVA Class Path can be maintained indicating file dependencies. FIG. 1 shows an exemplary data structure with an "Inverted" structure where links indicate that a file is depended on by another file and thus may have to be recompiled if the file is changed. Thus, file C and file D may have to be re-complied if file B is modified. The data structure can be produced by examining the files for dependencies to construct the dependency tree.

Figure 2:
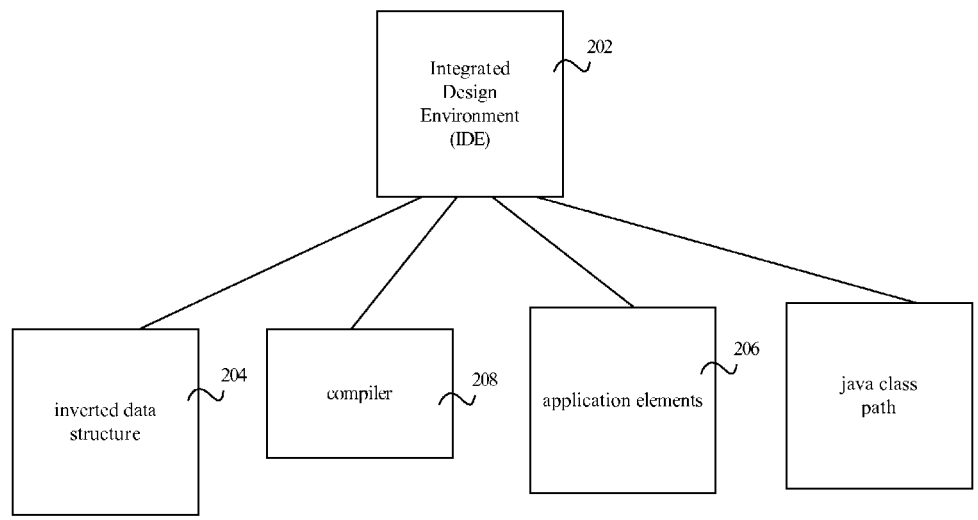
FIG. 2 shows a system for updating a complex application.

FIG. 2 shows an IDE 202 that uses a data structure 204 to determine which of the application elements 206 need to be recompiled in complier 208 as a result of a change to other applications elements.

In one embodiment, an indication is received related to a change in a Java Class Path. A first set of elements of the Java Class Path affected by the change can be determined. This first set of elements can be recompiled along with the elements determined for the data structure that have dependences on the first set of elements.

For the example of FIG. 1, the first set of elements could be file B with the elements determined to be dependent on the first set being file C and file D.

The element can be files, folders, archives of the like. The set of element can be a single element. The change to the Java Class Path can be an addition of an element, deletion of an element or the re-ordering of a Java Class Path.

Old and new class path comparison strings can be used, wherein matching values can be removed from the front of the strings until a non-matching value is found. This non-matching value from the new comparison string can be processed as an addition and, the non-matching value removed from both comparison strings. The method can loop until the Java Class Path comparison strings are empty.

The comparisons can be done in the order of determining entries removed, determining entries added, and determining entries re-ordered.

Java Classpath changes can be managed in an Integrated Design Environment (IDE); some process can run which updates the class paths as changes occur.

Changes to the class path can occur as a result of User Interface (UI) gestures in the IDE. A change to the classpath can be referred to as a "bounce" where a bounce is an addition, deletion or modification of the class references, or Jars on the classpath.

Bounces can occur due to:
1. change to the class path
2. change to the code in a JAR (i.e. to an included library)
3. change to another project being developed in parallel "Bouncy Jars" enable the IDE to dynamically build class path without the expense of recompiling the project.

"Bouncy jars" can apply to binary resource dependencies.

The system can to adjust to changes in the classpath without restarting the IDE and identify. The minimal amount of information needed to make changes to the classpath and continue process of incremental compilation.

Dependencies can be computed on the application, e.g. a Java Archive (JAR) file and changes to the dependent resources can be tracked in a copy of the current class path. When changes occur, the old and new versions of the classpath can be compared to determine what needs to be recompiled.

Package dependencies can be present in current package or in * referenced classes. Package dependencies can allow the IDE to know what to recompile.

Dependency graph can be computed from file to file (for example as a graph with up-pointers); this doesn't model dependencies but rather what is dependent on, see for example FIG. 1.

When a class path changes, a notification can be sent and the IDE can retrieve the new class path. The following comparisons can be done, in order, between the old class path and the new class path to:
  i. determine entries which have been removed
  ii. determine entries which have been added (new)
  iii. determine entries where changes have occurred.

To process additions:
If it is determined that any dependencies would be satisfied
  with these new classes (this is affected by Java's scoping
  rules), then the classes would be recompiled.

Package dependencies are used to resolve * references (there is implicit dependency on your own package as it may hide dependencies in other packages) one large tree—the package tree—can be maintained which contains references to nodes for all referenced classes. The tree is ordered by fully qualified names and the tree contains all winners and losers in terms of resolution of same names. The IDE can be used to provide view of the tree for the compilation context.

In one example, if a first directory in the Java Class Path includes "file I" and "file II"; a second directory in the Java Class Path includes "file II" and "file III" and a "file III" is added to the first directory in the Java class path, the new "file III" and elements dependent on "file III" need to be re-compiled. "File III" in the second directory is the loser in the name resolution.

To process deletion:
Recompile any code which has a dependency on the deleted
  code.

To process changes:
(things that existed before, exist now)
remove matching prefixes until you hit end or find a change
for changed node, process as an add, then remove it from the
  old path
continue processing the paths
E.g.
ABCD changes to ACBD
Look @ A, match, remove from both: BCD and CBD
Look @ B, no match to C
C is new, process as add Remove from both paths: BD and BD
Paths match, process complete One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nan systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A method comprising:
   maintaining an inverted tree data structure of an original Java class path indicating file dependencies, wherein the inverted tree data structure comprises a plurality of nodes representing a plurality of elements of the original Java class path, wherein the inverted tree data structure further comprises one or more links that indicate an element is depended on by another element, and wherein the inverted tree data structure further comprises element name resolution information;
   receiving an indication of a change in the original Java class path;
   retrieving a new Java class path that comprises the change in the original Java class path;
   determining a first set of elements of the original Java class path that have been affected by the change by comparing the original Java class path with the new Java class path, wherein the comparing comprises determining entries removed, determining entries added, and determining entries re-ordered;
   determining a second set of elements that have dependencies on the first set of elements using the inverted tree data structure; and
   recompiling the first set of elements and the second set of elements that have dependencies on the first set of elements.

2. The method of claim 1, wherein the first set of element is a single element.

3. The method of claim 1, wherein the change to the original Java class path is an addition of a new element.

4. The method of claim 3, wherein it is checked if there is any element dependent on the new element, and if so the new element and its dependent files are compiled.

5. The method of claim 1, wherein the change is a deletion.

6. The method of claim 5, wherein the element dependent on a deleted element is recompiled.

7. The method of claim 1, wherein the change is a reordering of the original Java class path.

8. The method of claim 7, wherein old and new class path comparison strings are used, wherein matching values are removed from the front of the strings until a non-matching value is found, the non-matching value from the new comparison string is processed as an addition and, the non-matching value is removed from both comparison strings.

9. The method of claim 8, wherein the method loops until the original Java class path comparison strings are empty.

10. The method of claim 1, wherein the comparing is done in the order of determining entries removed, determining entries added, and determining entries re-ordered.

11. The method of claim 1, wherein the elements include files.

12. The method of claim 1, wherein the elements include folders.

13. The method of claim 1, wherein the elements include archives.

14. A non-transitory computer-readable medium having instructions stored thereon that, when executed by a processor, cause the processor to re-compile elements, the re-compiling comprising:
   maintaining an inverted tree data structure of an original Java class path indicating file dependencies, wherein the inverted tree data structure comprises a plurality of nodes representing a plurality of elements of the original Java class path, wherein the inverted tree data structure further comprises one or more links that indicate an element is depended on by another element, and wherein the inverted tree data structure further comprises element name resolution information;
   receiving an indication of a change in the original Java class path;
   retrieving a new Java class path that comprises the change in the original Java class path;
   determining a first set of elements of the original Java class path that have been affected by the change by comparing the original Java class path with the new Java class path, wherein the comparing comprises determining entries removed, determining entries added, and determining entries re-ordered;
   determining a second set of elements that have dependencies on the first set of elements using the inverted tree data structure; and
   recompiling the first set of elements and the second set of elements that have dependencies on the first set of elements.

15. The non-transitory computer-readable medium of claim 14, wherein the change to the original Java class path is an addition of a new element.

16. The non-transitory computer-readable medium of claim 14, wherein the change is a deletion.

17. The non-transitory computer-readable medium of claim 14, wherein the change is a reordering of the original Java class path.

18. A system comprising:
a non-transitory computer-readable medium configured to store one or more instructions; and
a processor configured to execute the one or more instructions stored within the non-transitory computer-readable medium;
wherein, when executing the one or more instructions, the processor is further configured to:
maintain an inverted tree data structure of an original Java class path indicating file dependencies, wherein the inverted tree data structure comprises a plurality of nodes representing a plurality of elements of the original Java class path, wherein the inverted tree data structure further comprises one or more links that indicate an element is depended on by another element, and wherein the inverted tree data structure further comprises element name resolution information;
receive an indication of a change in the original Java class path;
retrieve a new Java class path that comprises the change in the original Java class path;
determine a first set of elements of the original Java class path that have been affected by the change by comparing the original Java class path with the new Java class path, wherein the comparing comprises determining entries removed, determining entries added, and determining entries re-ordered;
determine a second set of elements that have dependencies on the first set of elements using the inverted tree data structure; and
recompile the first set of elements and the second set of elements that have dependencies on the first set of elements.

19. The system of claim 18, wherein the change to the original Java class path is an addition of a new element.

20. The system of claim 18, wherein the change is a reordering of the original Java class path.

* * * * *